United States Patent
Edgerly (12)

(10) Patent No.: US 6,513,691 B1
(45) Date of Patent: Feb. 4, 2003

(54) SECURING ARRANGEMENT FOR AN ARTICLE TO A LOAD CARRIER

(75) Inventor: Jeffrey R. Edgerly, Bristol, CT (US)

(73) Assignee: Thule Sweden AB, Hillerstorp (SE)

( * ) Notice: Subject to any disclaimer, the term of this patent is extended or adjusted under 35 U.S.C. 154(b) by 0 days.

(21) Appl. No.: 09/650,716

(22) Filed: Aug. 30, 2000

Related U.S. Application Data

(63) Continuation of application No. 09/537,783, filed on Mar. 29, 2000.
(60) Provisional application No. 60/126,667, filed on Mar. 29, 1999.

(51) Int. Cl.[7] .................................................. B60R 9/00
(52) U.S. Cl. ....................... 224/537; 224/324; 224/325; 224/567; 224/568; 224/571; 224/572
(58) Field of Search ................................. 224/537, 324, 224/328, 567, 568, 571, 572, 325; 2/338; 211/17, 18, 19, 20; 24/17 A, 19, 69 CT; 206/315.3, 315.5

(56) References Cited

U.S. PATENT DOCUMENTS

| | | | |
|---|---|---|---|
| 4,386,709 A | * 6/1983 | Graber | 211/20 |
| 4,524,893 A | * 6/1985 | Cole | 224/324 |
| 5,303,857 A | * 4/1994 | Hewson | 224/282 |
| 5,495,970 A | * 3/1996 | Pedrini | 211/17 X |
| 5,497,927 A | * 3/1996 | Peterson | 224/537 X |
| 5,570,825 A | * 11/1996 | Cona | 224/537 X |
| 5,598,960 A | * 2/1997 | Allen et al. | 224/324 |
| 5,603,591 A | * 2/1997 | McLellan | 410/97 |
| 5,662,256 A | * 9/1997 | Bryan | 211/18 |
| 5,683,021 A | * 11/1997 | Setina | 206/317 |
| 5,779,120 A | * 7/1998 | Morford | 224/311 |
| 5,996,870 A | * 12/1999 | Shaver | 224/324 |
| 6,206,261 B1 | * 3/2001 | McCrary | 206/315.11 |

* cited by examiner

*Primary Examiner*—Stephen K. Cronin
*Assistant Examiner*—Maerena W. Brevard
(74) *Attorney, Agent, or Firm*—Howrey Simon Arndt & White LLP

(57) ABSTRACT

A device for removably securing an article having a elongate section to a portable frame used for transporting the article on a vehicle. The device comprises an elongate structure with a floor and sidewalls extending above the floor to form an open channel with the sidewalls including at least one slot parallel to the longitudinal axis of the floor. Part of the device is a conformable strap, having a first side opposite a second side, an insertable end and an enlarged end separated from the insertable end by a length of flexible material, the conformable strap having a plurality of binding elements on the first side and a plurality of contact elements disposed on the second side of the strap at the insertable end. The strap passes through a sidewall slot such that the insertable end and the length of flexible material lie adjacent to the outer surface of the elongate structure with the enlarged end restricted in at least one slot formed in the sidewall of the elongate structure, the enlarged end being sized to exceed the dimensions of the slot.

11 Claims, 5 Drawing Sheets

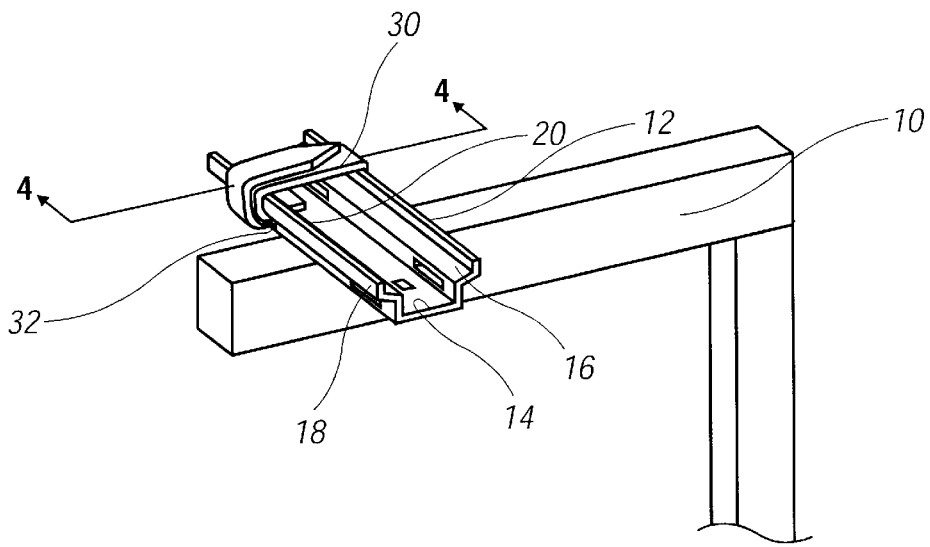
FIG. 3
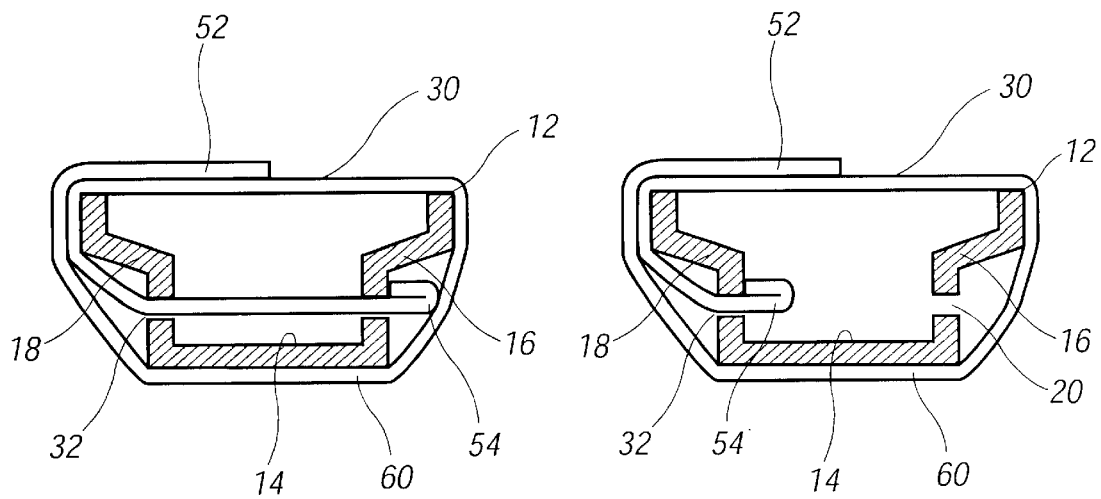
FIG. 4A   FIG. 4B

SECURING ARRANGEMENT FOR AN ARTICLE TO A LOAD CARRIER

RELATED PATENT APPLICATIONS

This application is a continuation patent application of U.S. application No. 09/537,783 filed Mar. 29, 2000 and entitled SECURING ARRANGEMENT FOR AN ARTICLE TO A LOAD CARRIER which claims priority to U.S. Provisional Application No. 60/126,667 filed Mar. 29, 1999 entitled EXCHANGEABLE SECUREMENT STRAP. Said applications in their entirety are hereby expressly incorporated by reference into the present application.

TECHNICAL FIELD

The present invention relates generally to a load carriers used in the transportation of articles such as sport equipment pieces, and more specifically to a releasably securable binding device for securing a portion of an article such as a bicycle to the load carrier frame which is typically configured to be mounted on a transporting vehicle.

BACKGROUND ART

Transportation of equipment, especially sports equipment, such as one or more bicycles, often involves the use of a portable load carrier frame attached at a hitch mount to the rear of a carrying vehicle. With advancements in design and related cost escalations for sports equipment, such as lightweight racing bicycles or ruggedly built mountain bikes, the security of attachment of these objects to a carrier frame has become a primary ownership consideration. The possibility of detachment of an expensive bicycle from a load carrier increases when the carrying vehicle travels over rough terrain. Any potential weakness associated with the means utilized to secure equipment to the load carrier frame could result in damage to the equipment either by falling from the frame or becoming sufficiently loose to collide with the frame or the carrying vehicle. Obviously, the securement of the sports equipment to the load carrier is of utmost importance to the operator, but ease of use is also an important consideration in the mind of the consumer.

It is known to use flexible securement straps adhesively bonded to a receiving cradle of a load carrier frame. Such straps represent a simple, low cost option for equipment attachment. Such straps are intended to be wrapped around a portion of the equipment and then secured until intentionally released. Over a period of time, the adhesive used to attach the such straps to the load carrier ages and may become brittle enough for bond failure to occur between the strap and the cradle. Also, repeated use of an adhesively bonded strap to secure and remove equipment from a carrier frame can result in weakening of this bond. If this occurs, the strap will no longer be effective for securing the equipment to the carrier frame and this can lead to damage, possibly severe, to the carried sports equipment.

In view of the above described deficiencies associated with the use of known designs for equipment binding and securement devices, the present invention has been developed to alleviate these drawbacks and provide further benefits to the user. These enhancements and benefits are described in greater detail hereinbelow with respect to several alternative embodiments of the present invention.

DISCLOSURE OF THE INVENTION

The present invention, in its several disclosed embodiments, alleviates the drawbacks described above with respect to conventionally designed binding devices and incorporates several additionally beneficial features.

A binding or securement device constructed according to the present invention includes a recessed support tray or bracket and a conformable securement strap that has several design features included that reduce down to two the actual number of parts required for such a binding device or securement strap to perform appropriately. The conformable strap may be formed from a flexible material such as fabric, rubber or plastic that has sufficient strength and resiliency to bind and secure an article placed in the recessed tray or channeled support bracket. Preferably the conformable strap comprises a soft flexible webbing or belting material to bind a secured article without scratching or otherwise damaging the article.

One end of the flexible strap is tapered for easy insertion and passage through a slot formed in a sidewall of the support bracket. This tapered end may be referred to as the insertable end of the strap. The surfaces on either side of the insertable end have differing characteristics. One surface is essentially planar while the other surface is at least partially covered with releasable securement members such as one component of a hook-and-loop connector.

The opposite end of the strap from the insertable end has a configuration providing a segment of greater thickness than other portions of the strap which are otherwise of essentially uniform thickness. Increasing the thickness of this end section provides a enlarged and impassable end of the conformable strap. In one embodiment of the invention the thickened or enlarged end may be formed by simply folding and securing an end section of the strap upon itself to provide an enlarged end having at least twice the thickness of the opposite insertable end of the strap.

Another embodiment includes a wedge profile increasing in thickness towards the extremity of the enlarged end of the conformable strap opposite the insertable end. Yet another embodiment includes at least one transverse extension projecting from one or both of the sides or edges at the enlarged end. Other forms of increasing the thickness of the enlarged end may be used, provided that features of this enlarged end cause interference with the slot formed in the sidewall of the support bracket to prevent the enlarged end from passing through the slot.

Between the insertable end and the enlarged end of the conformable strap lies a length of flexible material sufficient to be wrapped around the recessed support bracket; preferably, the length of the strap is sufficient that several wraps about the bracket are possible for added security. At least one of the surfaces of the length of flexible material is predominantly covered with releasable securement members such as one component of a hook-and-loop connector. This type of covering is preferably formed on the side of the length of flexible material opposite the side supporting the projections associated with the insertable end of the conformable strap. The relative positioning between the mating components of the releasable securement members of the hook-and-loop connector causes their proper face-to-face orientation when the strap is appropriately wrapped about the support bracket and ultimately upon itself. Under application of some engaging pressure by the operator, the two matingly engageable components of the exemplary hook-and-loop connector are releasably interlocked to secure the insertable and loose end of the strap to another portion of the length of flexible material.

The simplicity of the two part binding device of the present invention allows quick securement and release of objects to and from the support bracket. Such objects have suitable size to initially fit in the recess or channel of the support bracket and be held therein by overlapping the object with the conformable strap which is ultimately fastened upon itself by engagement of the releasable securement components. The addition of tension into the strap by an operator for the purpose of increasing the securement characteristic of the strap over an article to be secured results from catching the enlarged end of the conformable strap within a slot cut in the support bracket and pulling tightly on the free distal end. This is achieved by threading the insertable end of the strap into the slot in the sidewall of the support bracket and drawing the strap through the slot until prevention of further relative movement is caused by the impingement of the thicker enlarged end of the strap against the bracket about the slot. This anchors the enlarged end of the strap to the support bracket so that it may be stretched and pulled tight as it is wrapped around an object thereby increasing tension within the strap and resultingly the securement force of the strap upon the object, such as a bicycle to be secured upon a load carrier. When using releasable hook-and-loop connector assemblies, release of the strap simply involves operator separation of the opposed interlocking surfaces.

Since the support bracket typically comprises a rigid material, objects held within the binding clamp of the invention may be subject to scratching or denting. Attachment of a buffering lining inside the bracket prevents such undesirable occurrences. As illustrated, this buffering element may be provided in the form of a rubber matting which is maintained between the support bracket and the carried item, such as a bicycle.

In at least one embodiment, the present invention takes the form of a device for removably securing an article, having a elongate section, to a portable frame or load carrier designed to be connected upon a transporting vehicle. The device includes an elongate support structure having an inner surface and an outer surface and opposite distal ends. The support structure has a floor and sidewalls that extend above the floor to form a channel open at the two distal ends thereof. The sidewalls include at least one slot cut therethrough and oriented parallel to the longitudinal axis of the floor. A conformable strap is also utilized that has a first and second side surfaces, an insertable end and an enlarged end separated from the insertable end by a mid-section composed of a length of flexible strap material. The conformable strap has a plurality of binding elements on the first side and a plurality of contact elements disposed on the second side of the strap at the insertable end. In a preferred embodiment, these binding and contact elements take the form of releasable securement members such as engageable components of a hook-and-loop connector assembly.

In use, the strap is passed through the slot from an interior region of the support structure so that the insertable end and a majority of the length of the flexible strap are positioned exteriorly to the other surface of the elongate structure and the enlarged end of the strap is abutting the area of the support about the slot since the enlarged end of the strap is sized to exceed the dimensions of the slot and resist passage therethrough.

As used herein the term support bracket may also be described as an elongate structure or a bracket or cradle or brace. The term binding device may be replaced by the term binding clamp. Further, the term projection or projections may be replaced by the words contact elements. Still further, it should be appreciated that the invention may be characterized as only including the flexible strap and its constituent components, with the support structure with which such a strap cooperates being an optional additional component.

The beneficial effects described above apply generally to the exemplary devices and mechanisms disclosed herein for a releasable securement device. The specific structures through which these benefits are delivered will be described in detail hereinbelow.

BRIEF DESCRIPTION OF THE DRAWINGS

The invention will now be described in greater detail in the following way of example only and with reference to the attached drawings, in which

FIG. 3 is a perspective view showing a conformable strap of the invention and its position relative to a support bracket mounted on a portable frame.

FIGS. 4a and 4b provide similar cross sectional views taken along line 4—4 of FIG. 3 showing attachment of a conformable strap to a bracket of the invention.

MODE(S) FOR CARRYING OUT THE INVENTION

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

Figure 1:
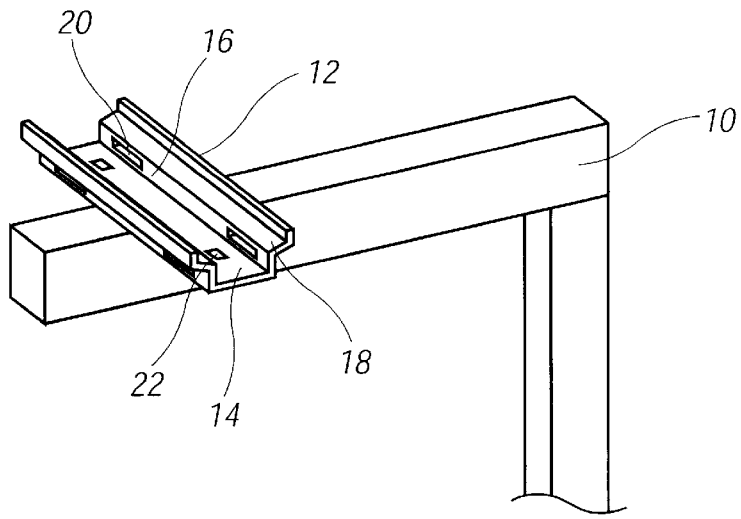
FIG. 1 is a perspective view showing a support bracket of the invention mounted on a portable frame such as a load carrier for sports equipment like bicycles.

Referring to the Figures and using like reference numerals to identify like parts throughout the several views, FIG. 1 includes a portable frame 10 with a recessed, generally u-shaped support bracket 12 that is attached to the frame 10. The portable frame 10 may be used to connect the support bracket 12 to a able vehicle. The bracket 12 includes a floor 14 and sidewalls 16,18 with at least one slot 20 in each sidewall 16,18. Optionally, the bracket 12, may have one or more openings 22 formed in the floor 14 of the bracket 12 to receive a protective insert.

Figure 2:
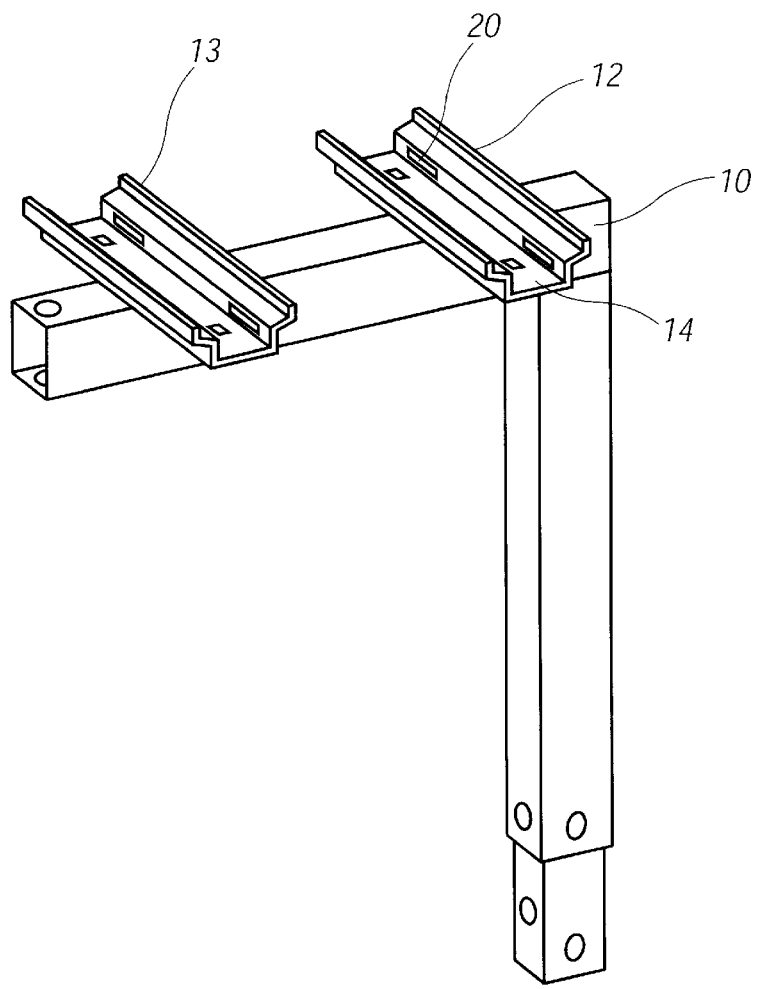
FIG. 2 is a perspective view showing first and second support brackets mounted on a portable frame.

FIG. 2 is a perspective view similar to FIG. 1 with the addition of a second bracket 13 in accordance with the present invention which is also attached to the portable frame 10 indicating that the load carrier or transportation frame may be designed to carry multiple objects secured upon the brackets 12,13. In one particularly preferred embodiment, the load carrier is designed to be mounted upon a transporting vehicle and to receive one or more pieces of sports equipment, especially in the form of bicycles.

Figure 5A:
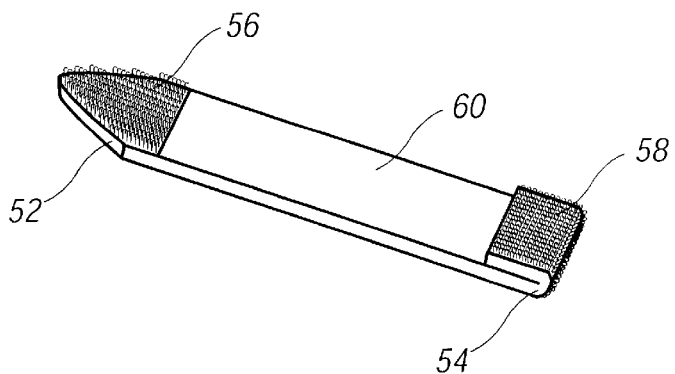
FIGS. 5a, 5b and 5c show perspective views of the comfortable strap of the invention, progressing from an open condition to a fastened condition.
Figure 5B:
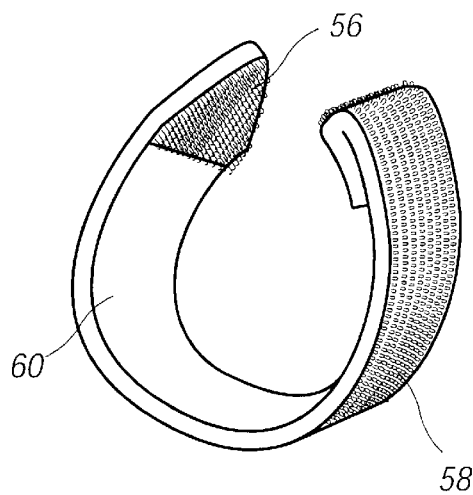
Figure 5C:
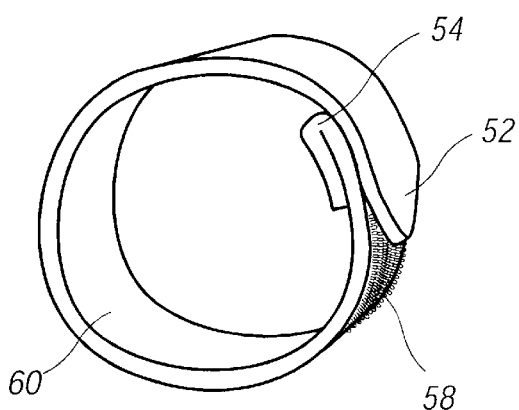

FIG. 3 shows a conformable strap 30 that has been inserted through slots 20,32 formed in the sidewalls 16,18 of a bracket 12. After wrapping the conformable strap 30 around the support bracket 12 and partially around itself, the strap 30 may be releasably secured upon itself to maintain such a wrapped configuration about the bracket 12 and any carried article secured thereby. Additional details of the positioning of the conformable strap 30 are clear through reference to FIG. 4a, FIG. 4b, and FIGS. 5a through 5c. FIG. 4a and FIG. 4b represent similar cross-sectional views, both of which are taken along line 4—4 of FIG. 3. The difference between FIG. 4a and FIG. 4b is the positioning of the conformable strap 30 relative to the slots 20,32 formed in the sidewalls 16,18 of the bracket 12. FIGS. 5a through 5c provide detail views of the conformable strap 30 of the invention and the attributes of the strap 30 used in attaching it to a support bracket 12. Thereafter, the strap 30 is available for securing articles such as bicycles to the bracket 12 and retaining those articles securely thereupon utilizing the releasable securement members that preferably take the form of engageable hook-and-loop connectors.

In the various views relating to FIG. 4 and FIG. 5, it is see at the conformable strap 30 includes an insertable end 52 and an enlarged end 54. In the preferred embodiment and that which is illustrated, the enlarged end 54 is produced by doubling or folding a portion of the strap 30 upon itself and unifying those folded portions by, for example, sewing the portions together in the case where webbed belting is used for the construction of the strap 30. In this manner, the enlarged portion is formed to be approximately twice the thickness of the balance of the strap 30. This low cost method of increasing the thickness of the strap 30 provides an effective way to check passage of the conformable strap 30 through a slot in the bracket 12. This simple sewn fold is as effective at limiting passage of that portion through the slots of the support as other more extravagantly formed thickening procedures that require the addition of extraneous material to the strap during manufacture. Additional production steps represent undesirable increased costs for part production and are therefore avoided. Also, because the fold is integrally formed with the rest of the strap, there is no weakness at the junction between the enlarged end 54 and the flexible material 60. Thus, the combination of the conformable strap 30 and the support bracket 12 provides an improved binding clamp that renders cost savings without weakening the binding element, i.e. the conformable strap 30.

FIG. 4 provides detail of two alternatives for attaching the conformable strap 30 to the support bracket 12 using a variable number of slots 20,32. The embodiment of FIG. 4a uses slots 20,32 formed in opposing side-walls of a support bracket 12. In this case, threading of the conformable strap 30 through the slots 20,34 begins by positioning the insertable end 52 outside the bracket before passing it through a first sidewall slot 20, across the width of the channel and through a second slot 32 in the opposite sidewall 18. The remainder of the strap 30 may then be drawn through the first and second sidewall slots 20,32 until the enlarged end 54 catches against the slot 20 which, being smaller in size, prevents further movement of either the enlarged end 54 or other parts of the conformable strap 30. The length of strap 30 outside of the bracket 12 may be wrapped upon itself and then held in a wrapped condition utilizing interlocking projections 56 found on the insertable end 52 and binding elements 58 found on the flexible material 60.

FIG. 4b discloses a second embodiment of a binding clamp constructed according to the present invention showing the enlarged end 54 of the conformable strap 30 retained inside the channel of the support bracket 12. The enlarged end 54 is unable to pass through the slot 32 due to its size. With the enlarged end 54 restrained in this manner, the conformable strap 30 is wrappable upon itself, under tension, before securing the insertable end 52 to a section of flexible material 60. Further details of securing the conformable strap 30 in a wrapped condition are shown through reference to FIG. 5 wherein one side of the conformable strap 30, at the insertable end 52, includes an area of hook-like projections 56 sized to interlock with binding elements 58 disposed over the surface of the other side of the conformable strap 30. Areas covered by binding elements 58 include the outer surface of the enlarged end 54 and the flexible material 60 separating the enlarged end 54 from the insertable end 52 of the conformable strap 30. The projections 56 may be hooks or contacts while the binding elements 58 may be loops to provide the well known hook-and-loop type of fastening structure.

With the conformable strap 30 in extended or partially wrapped condition (see FIG. 5a and FIG. 5b), the projections 56 and binding elements 58 are held apart by their relative positioning on opposite sides of the conformable strap 30 or the distance of separation between the insertable end 52 and the enlarged end 54. However, when the insertable end 52 begins to overlap the flexible material 60, intervening between insertable end 52 and enlarged end 54, the probability increases for interlocking of the projections 56 and binding elements 58. In a fully overlapped condition as shown in FIG. 5c the wrapped configuration becomes stable by interlocking the projections 56 and the binding elements 58 to hold the insertable end 52 against the flexible material 60 of the conformable strap 30. Thus, the conformable strap 30 may be us o form a wrapped configuration fixed relative to the bracket 12 using either one or two slots 20,32 disposed in the sidewalls 16,18 of the bracket 12.

Figure 6:
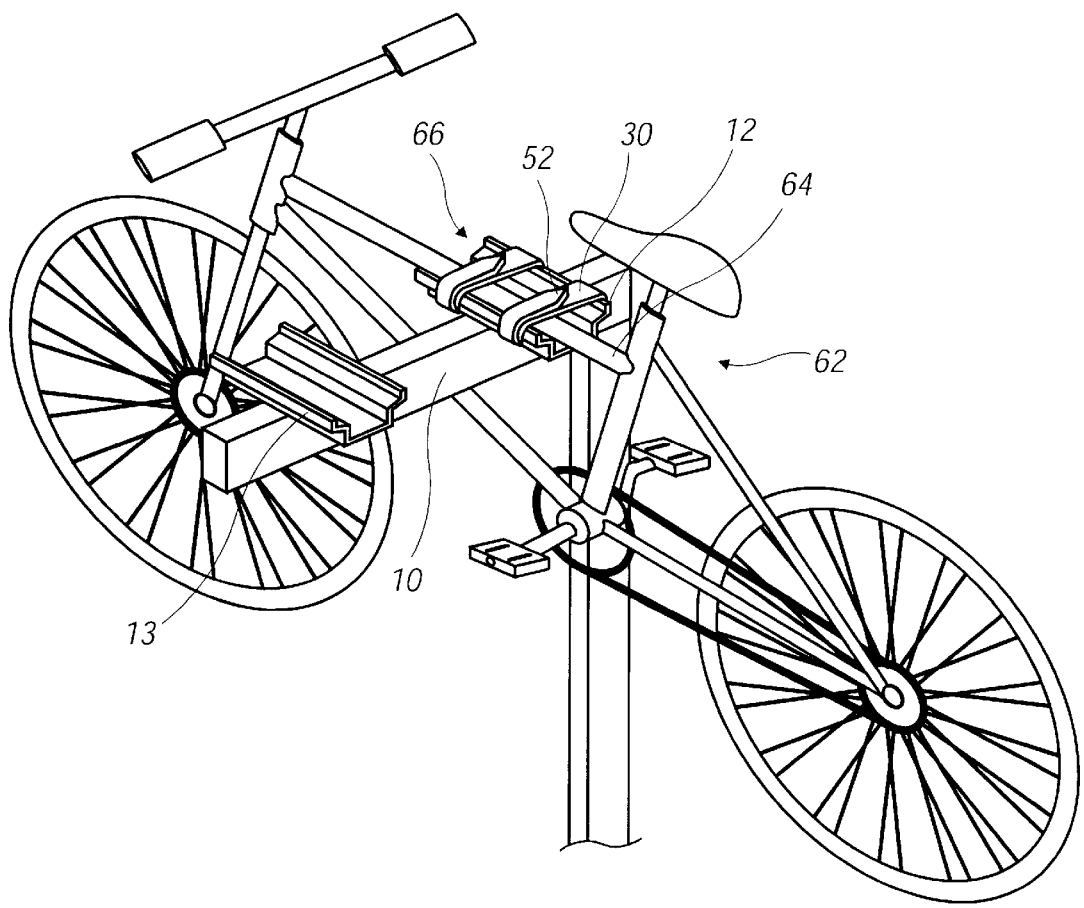
FIG. 6 shows a suitable object secured, by the binding device of the invention, to a portable frame.

FIG. 6 shows how the binding clamp of the invention, comprising the support bracket 12 and conformable strap 30, may provide a secure mount to attach an object 62, such as a bicycle to a load carrier 10 attached to a transporting vehicle for point-to-point transportation of the object 62. As shown, an elongate section 64 of the object, in this case the crossbar of the bicycle, fits in the channel of the bracket 12 to provide suspension support for the whole object 62. While sufficient to support the weight of the object 62, the bracket 12 is inadequate alone to prevent the elongate section 64 from being jarred from the bracket 12 by vibration during transit. The combination of the support bracket 12 with a conformable strap 30 adds the additional security to prevent such a mishap. By applying several wraps of the conformable strap 30 around an elongate section 64 of a transportable object 62, and fastening the insertable end 52 to the strap 30, the object is held upon the bracket 12 and the strap 30 combination which acts as a binding clamp for the object 62.

The elongate section 64 of the strap 30 may be held under varying levels of tension related to the pull force acting, during wrapping, on the conformable strap 30 due to the anchoring of the enlarged end 54 against one or more slots 20,32 in the sidewalls 16,18 of the bracket (see FIG. 4). For additional safety, a second binding clamp 66 may encircle a second portion of the elongate section 64 of a transportable object 62. This dual clamping arrangement is particularly effective to increase the force of stabilization on an object or objects that may be driven over rough terrain.

Figure 7:
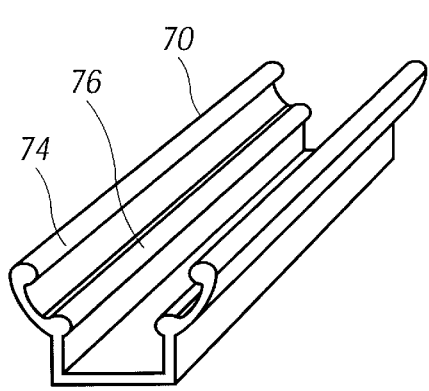
FIG. 7 provides a perspective view of a cushioning insert for a support bracket of the invention.
Figure 10:
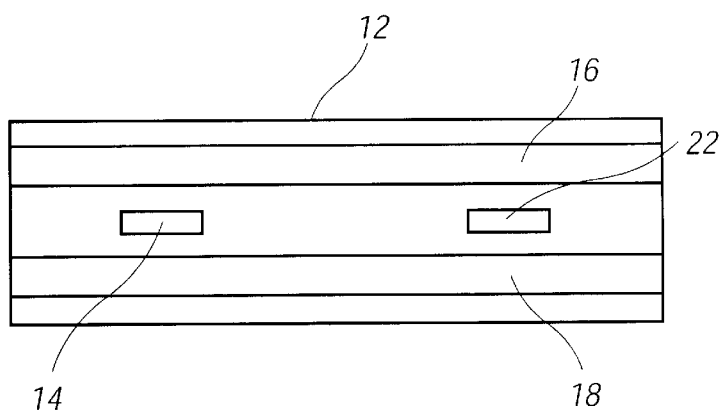
FIG. 10 is a plan view of a support bracket, viewed from above, showing slots suitable for attaching an insert to the bracket.

As described previously, the binding clamp of the invention may be used with elongate sections of articles to be transported, usually suspended from a portable frame, typically in the form of a load carrier that is attached to a transporting vehicle such as a car, van or truck. Such transportable objects include, but are not limed to, bicycles, skis, snow-boards, water skis, surfboards, windsurfing boards and the like. Some of these objects may be highly polished or decorated with colorful designs that may be scratched or otherwise damaged as a result of contact with a rigid support bracket. With the present invention, a cushioning or buffering insert fits snugly inside the bracket to essentially eliminate problems of scratching and related damage. FIG. 7 provides a perspective view of the cushioning insert 70 having a cross section closely resembling that of the channel of the support bracket 12 depicted in the plan view of FIG. 10. FIG. 7 includes ribs 74,76 of the cushioning material of the insert 70 to reduce contact and damage with elongate sections of objects placed inside the insert 70. The insert 70 includes several insert slots 72 that align with slots 20,32 in a support bracket 12 so that a conformable strap of flexible material, preferably in the form of webbing, may pass through both the support bracket 12 and the insert 70 for securing an elongate section 62, such as the cross bar of a bicycle.

Figure 8:
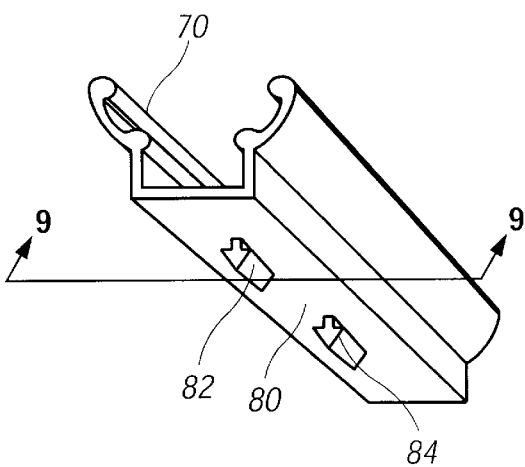
FIG. 8 is a perspective view revealing the underside of the liner of FIG. 7.
Figure 9:
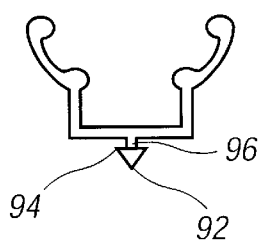
FIG. 9 shows a cross sectional view of the insert as viewed along line 9—9 of FIG. 8.

FIG. 8 is a perspective view showing pointed locking studs 82,84 integrally formed with the base 86 of the cushioning insert 70: FIG. 9 provides a cross sectional view of the cushioning insert taken along lines 9—9 of FIG. 8. This shows a pointed head 92 including a skirt portion 94 connected to a neck portion 96 which joins the locking stud 82 to the base 86 of the cushioning insert 70.

Figure 11:
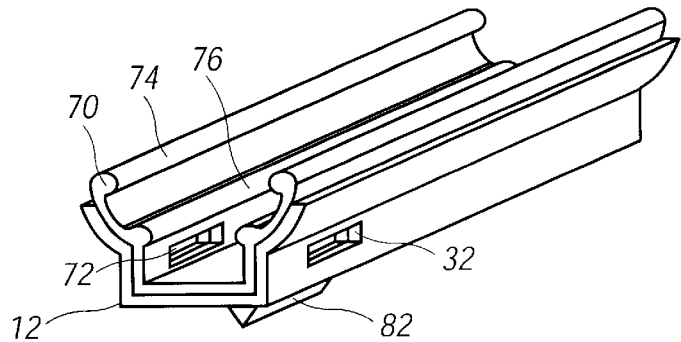
FIG. 11 is a perspective partial view including a cushioning insert inside a support bracket according to the present invention.

The base 86 of the cushioning insert 70 may abut the floor 14 of the support bracket 12 using one or more locking studs 82 integrally molded with the base 86 of the insert 70. Attachment of the insert, as illustrated in FIG. 11, involves passing the pointed head 92 of a locking stud 82 through a mounting hole 22 in the floor of the bracket 12 until the neck 96 of the stud 82 extends at least the thickness of the floor 14 of the support bracket 12. Between the point 92 and neck portions 96 of the stud is a skirt portion 94 having a width greater than the width of the mounting hole 22. During placement of the stud 82 in the mounting hole 22, the skirt portion 94 flexes during passage through the hole 22 then recovers to overlap the hole 22 on the outer surface of the floor 14 of the bracket 12. This provides a locking mechanism, which may be of a temporary nature, between the cushioned insert 70 and the support bracket 12. The alignment of slots 20,32,72 allows insertion of a conformable strap, also referred to herein as a flexible strap, in previously discussed wrap-around configurations for securing an object to a support bracket 12. Preferably support bracket 12 contains an insert 70 to prevent scratching of an object secured thereto using a conformable strap 30 of relatively soft and smooth flexible webbing.

Since other different embodiments of this invention could be made without departing from the scope thereof, it is intended that all matter contained in the above description and accompanying drawings shall be interpreted as illustrative and not in a limiting sense.

A conformable strap and several possible accompanying and complimentary components have been described herein. The strap alone, as well as in combinations with other components such as the support trays will be appreciated by those skilled in the art as being within the intended scope of this invention as claimed below. As previously stated, detailed embodiments of the present invention are disclosed herein; however, it is to be understood that the disclosed embodiments are merely exemplary of the invention that may be embodied in various forms.

INDUSTRIAL APPLICABILITY

The present invention finds applicability in the load carrier industries, and especially in the sport rack industry.

What is claimed and desired to be secured by Letters Patent is as follows:

1. A binding arrangement for releasably securing an article to a portable frame, said binding arrangement comprising:
   - an elongate support bracket having an outer surface and proximate and distal ends, said support bracket including a floor and sidewalls extending above said floor to form a channel open at said proximate end and said distal end of said structure;
   - said elongate support bracket including a longitudinal cushioning insert having a support surface and a base, said cushioning insert positioned in said channel to prevent damage to the elongate section when in contact with said support surface during transportation of the article;
   - at least one conformable strap releasably engageable with said elongate support bracket with a portion of said conformable strap adjacent said outer surface of said elongate support bracket and adapted to over lay an elongate section placed in said channel of said elongate support bracket to secure the elongate section to said elongate support bracket during transportation of an article which includes the elongate section; and
   - said conformable strap having a first side opposite a second side, an insertable end and an enlarged end separated from said insertable end by a length of flexible material, said conformable strap having a plurality of binding elements on said first side and a plurality of contact elements disposed on said second side of said strap at said insertable end, said strap passing through said slot such that said insertable end and said length of flexible material lie adjacent said outer surface of said elongate structure with said enlarged end restricted in said at least one slot of said elongate support bracket, said enlarged end being sized to exceed the dimensions of said slot.

2. The binding arrangement as recited in claim 1, wherein said elongate support bracket is adapted to capture said cushioning insert to restrict movement thereof.

3. The binding arrangement as recited in claim 1, further comprising at least one rib formed at said support surface of said cushioning insert.

4. The binding arrangement as recited in claim 1 wherein said elongate support bracket further includes at least one slot in said sidewalls.

5. A binding arrangement for releasably securing an article to a portable frame, said binding arrangement comprising:
   - an elongate support structure forming an open channel having inner and outer surfaces and two opposite ends;
   - at least one through-slot in said elongate structure;

a strap comprising first and second opposite sides and an insertable and an enlarged end separated by a length of flexible material, said strap having a plurality of binding elements on said first side and a plurality of contact elements disposed on said second side of said strap at said insertable end, said strap passing through said slot such that said insertable end and said length of flexible material lie substantially adjacent said outer surface of said elongate structure with said enlarged end restricted at said through-slot, said enlarged end of said strap being sized to exceed the dimensions of said through-slot;

a cushioning insert having a support surface and a base, said cushioning insert positioned in said open channel to prevent damage to an article positioned therein during transport; and at least one rib formed at said support surface of said cushioning insert.

6. The binding arrangement as recited in claim 5 wherein said enlarged end of said strap is formed by a secured-together, folded portion of said strap.

7. The binding arrangement as recited in claim 5 wherein said elongate support structure captures said cushioning insert to restrict movement thereof.

8. The binding arrangement as recited in claim 5 wherein said elongate support structure has a receiving opening and said cushioning insert has a stud sized for capture and retention in said receiving opening for limiting movement of said cushioning insert in said channel of said elongate support structure.

9. The binding arrangement as recited in claim 8 wherein said receiving opening is formed in a floor of said elongate support structure for capture of said at least one stud attached to said base of said cushioning insert.

10. A binding arrangement for releasably securing an article to a portable frame, said binding arrangement comprising:

an elongate support bracket having an outer surface and proximate and distal ends, said support bracket including a floor and sidewalls extending above said floor to form a channel open at said proximate end and said distal end of said structure;

said elongate support bracket including a longitudinal cushioning insert having a support surface and a base, said cushioning insert positioned in said channel to prevent damage to the elongate section when in contact with said support surface during transportation of the article;

at least one conformable strap releasably engageable with said elongate support bracket with a portion of said conformable strap adjacent said outer surface of said elongate support bracket and adapted to over lay an elongate section placed in said channel of said elongate support bracket to secure the elongate section to said elongate support bracket during transportation of an article which includes the elongate section; and wherein said elongate support bracket has at least one opening and said cushioning insert includes at least one stud sized for capture and retention in said at least one opening of said elongate support bracket to limit movement of said cushioning insert in said channel of said elongate support bracket.

11. The binding arrangement as recited in claim 10 wherein said at least one opening is formed in said floor of said elongate support bracket for capture of said at least one stud attached to said base of said cushioning insert.

* * * * *